United States Patent
Lindblom

(10) Patent No.: US 7,344,580 B2
(45) Date of Patent: Mar. 18, 2008

(54) FILTER UNIT

(75) Inventor: Thomas Lindblom, Lidkoping (SE)

(73) Assignee: Absolent AB, Lidkoping (SE)

( * ) Notice: Subject to any disclaimer, the term of this patent is extended or adjusted under 35 U.S.C. 154(b) by 181 days.

(21) Appl. No.: 10/490,387

(22) PCT Filed: Sep. 13, 2002

(86) PCT No.: PCT/SE02/01638

§ 371 (c)(1),
(2), (4) Date: Jul. 8, 2004

(87) PCT Pub. No.: WO03/028851

PCT Pub. Date: Apr. 10, 2003

(65) Prior Publication Data

US 2005/0011172 A1 Jan. 20, 2005

(30) Foreign Application Priority Data

Oct. 2, 2001 (SE) .................................. 0103274

(51) Int. Cl.
B01D 46/02 (2006.01)
(52) U.S. Cl. .............................. 55/486; 55/484; 55/485; 55/527; 55/DIG. 43; 55/DIG. 45; 55/482; 210/490; 210/491; 210/499; 210/500.1; 442/181; 442/239; 442/327; 95/286; 95/287
(58) Field of Classification Search .......... 55/484–486, 55/527, DIG. 43, DIG. 45, 482; 210/490, 210/491, 499, 500.1; 442/181, 239, 327; 95/286, 287

See application file for complete search history.

(56) References Cited

U.S. PATENT DOCUMENTS

| 3,857,688 | A | * | 12/1974 | Wisnewski | .................... 55/483 |
| 4,419,113 | A | * | 12/1983 | Smith | .......................... 55/484 |
| 4,801,382 | A | * | 1/1989 | Kemmelmeyer | ......... 210/323.1 |
| 4,830,749 | A | * | 5/1989 | Okamoto et al. | ........ 210/323.2 |
| 5,667,544 | A | | 9/1997 | Haas et al. | |
| 5,780,811 | A | | 7/1998 | Kawamura | |
| 5,976,225 | A | * | 11/1999 | Nystrom et al. | ............... 95/278 |
| 6,063,170 | A | | 5/2000 | Deibert | |
| 6,165,244 | A | * | 12/2000 | Choi | .......................... 55/527 |
| 6,767,378 | B2 | * | 7/2004 | Nishiyama et al. | ........... 55/309 |
| 7,169,200 | B2 | * | 1/2007 | Kolstad et al. | ............. 55/282.2 |
| 2002/0073666 | A1 | * | 6/2002 | Cutler et al. | ................... 55/482 |

FOREIGN PATENT DOCUMENTS

| DE | 29 804988 | 8/1998 |
| DE | 29 909495 | 10/1999 |

* cited by examiner

Primary Examiner—Duane Smith
Assistant Examiner—Minh-Chau T. Pham
(74) Attorney, Agent, or Firm—Dennison, Schultz & MacDonald

(57) ABSTRACT

Converting machines give rise to polluted air which must be removed with the aid of fans and filters. The invention aims at removal of the polluted air in such a way that the servicing interval is greatly extended by the use of a filter unit having a number of part-filters arranged one after the other and formed of pleated fiber mats, the various mats having different filtering properties.

18 Claims, 3 Drawing Sheets

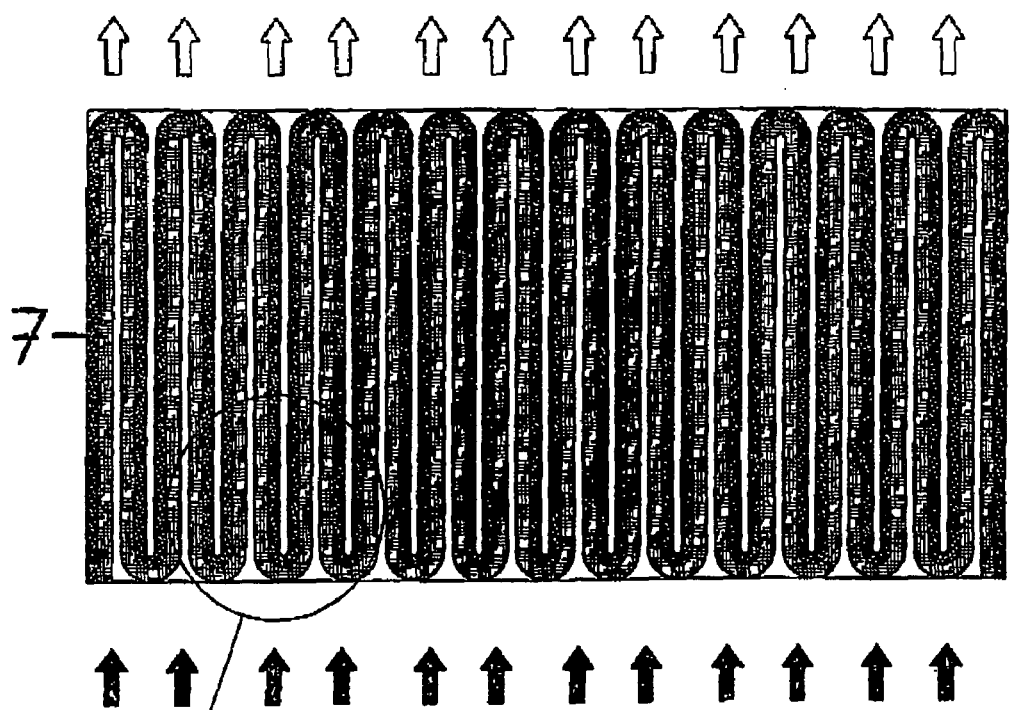
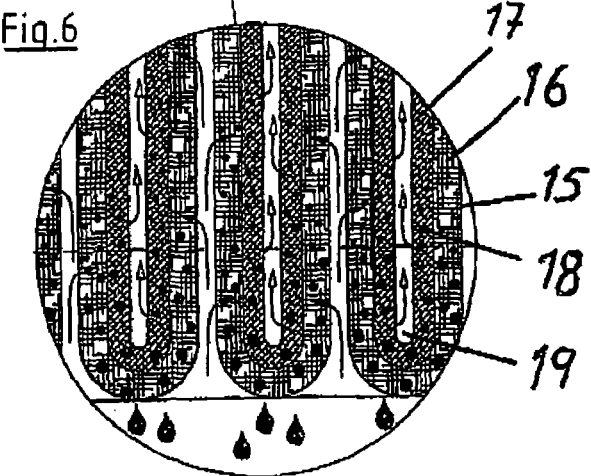
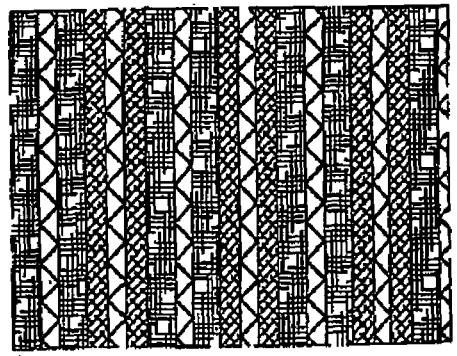

FILTER UNIT

BACKGROUND OF THE INVENTION

A filter unit has an important function to fulfil in today's society since polluted air is generated in many places. Such air can be supplied to the inlet opening of a filter unit, pass through it, and shed all impurities so that clean air flows out of the outlet of the filter unit and can be mixed with air in the normal atmosphere. The filter in a filter unit can be constructed in many different ways. It may be constructed mechanically and consist of various layers of material that permit diffusing. The problem with existing filter units is that they require frequent servicing and service is expensive. It is therefore desirable to provide a filter for which the service intervals are as long as possible.

The object of the present invention is to provide a filter unit that forms part of an industrial plant and where maximal intervals are obtained between servicing. The filter unit has an inlet opening and an outlet opening. The outlet opening is connected to an extractor that produces negative pressure. The inlet opening of the filter unit is connected, via a connection unit, with a unit that generates polluted air. In accordance with the invention a number of part-filter units are stacked one above the other so that a series-connected filter is obtained. Each part-filter comprises a number of filter mats located parallel with the flow direction of the air and also with each other. The individual mats are spaced from each other and are suitably formed from a single fibre mat that is pleated. A mat consists of an intermediate layer and a surface layer on each side of the intermediate layer. The surface layer consists of fibres that are thermally joined and form permeable openings for air containing particles. Between said surface layers is an intermediate layer suitably having a thickness of between 10 and 20 mm The intermediate layer consists of several layers of fibres and its diameter may be between 5 and 15 μm. The intermediate layer may have a density of 100-200 kg/m$^3$. Polluted air can pass through such a part-filter unit with fibre mats in the direction of the stacked part-filter units. When flowing air enters a part-filter unit it is arranged to flow through a mat. The filtering property obtained through flowing air is dependent on the speed at which it passes through the mat and the density of the mat. It has been found that if the flow velocity through the mat is lower than preferably 0.1 m/s the particles to be sorted out will fall down against the flow direction so that the part-filter unit becomes substantially self-cleaning. The filtering action is thus dependent on the flow velocity through the mat, the density of the mat and the size of the fibres. The fibres in the mat may be pinned.

In certain cases it may be advisable to have an intermediate layer consisting of two layers, in which case one layer may be of the same type as that described above. The additional layer has fibres that are randomly oriented and suitably have a diameter of 0.5-3.5 μm. The layer may have a thickness of about 5-10 mm and a density suitably lying between 20 and 30 kg/m$^3$.

Each of the various part-filter units in a stack is intended for particles of a predetermined size. The number of part-filter units desired is determined by how polluted the air is. The part-filters stacked one on top of the other can together supplied air that is absolutely free from particles.

The part-filter located nearest the exit of the filter unit is a security unit for the entire filter unit. In this filter unit the fibre mats consist of a HEPA mat which guarantees filtration of 99.97% and filters particles with a diameter of down to 3 μm. This part-filter unit thus guarantees that the total filter unit will function if any of the previous part-filters fails to function. If the previous part-filters function perfectly there will be extremely low load on the filter nearest the exit from the filter unit.

The velocity of polluted air from operating machines should be adjusted by the extractor to 20 m/s in order to prevent impurities becoming lodged on the transfer unit. A collecting unit is arranged at the inlet to the filter unit to collect liquid and heavy particles. A velocity of 6 m/s is suitable for the air flowing into the inlet opening of the stacked part-filter units.

The filter mats in a part-filter unit may be arranged in a tubular magazine that is open at the top and bottom and forms a unit that is easily replaceable when servicing is required.

The extractor arranged at the outlet end of the filter unit may be built into the filter unit to form a single unit or it may be arranged separate from the filter unit.

The extractor, filter unit and transfer means should constitute a hermetically sealed unit.

To obtain the correct speed a number of sensors are placed at various points in a complete plant and connected to a control unit which in turn regulates the air flow.

The air flow through a filter mat is controlled by the negative pressure prevailing on the side where the air leaves the mat after having passed through it.

Additional characteristics of the present invention are revealed in the following description describing one embodiment of the invention and in the appended claims.

BRIEF DESCRIPTION OF THE SEVERAL VIEWS OF THE DRAWING

The invention will be described in more detail with reference to the accompanying drawings in which FIG. 5 shows a pleated filter mat for a magazine with two layers between the outer layers FIG. 6 shows an enlarged view of part of FIG. 5, and FIG. 7 shows a cross section through the partial view in FIG. 6.

DETAILED DESCRIPTION OF THE INVENTION

Figure 1:
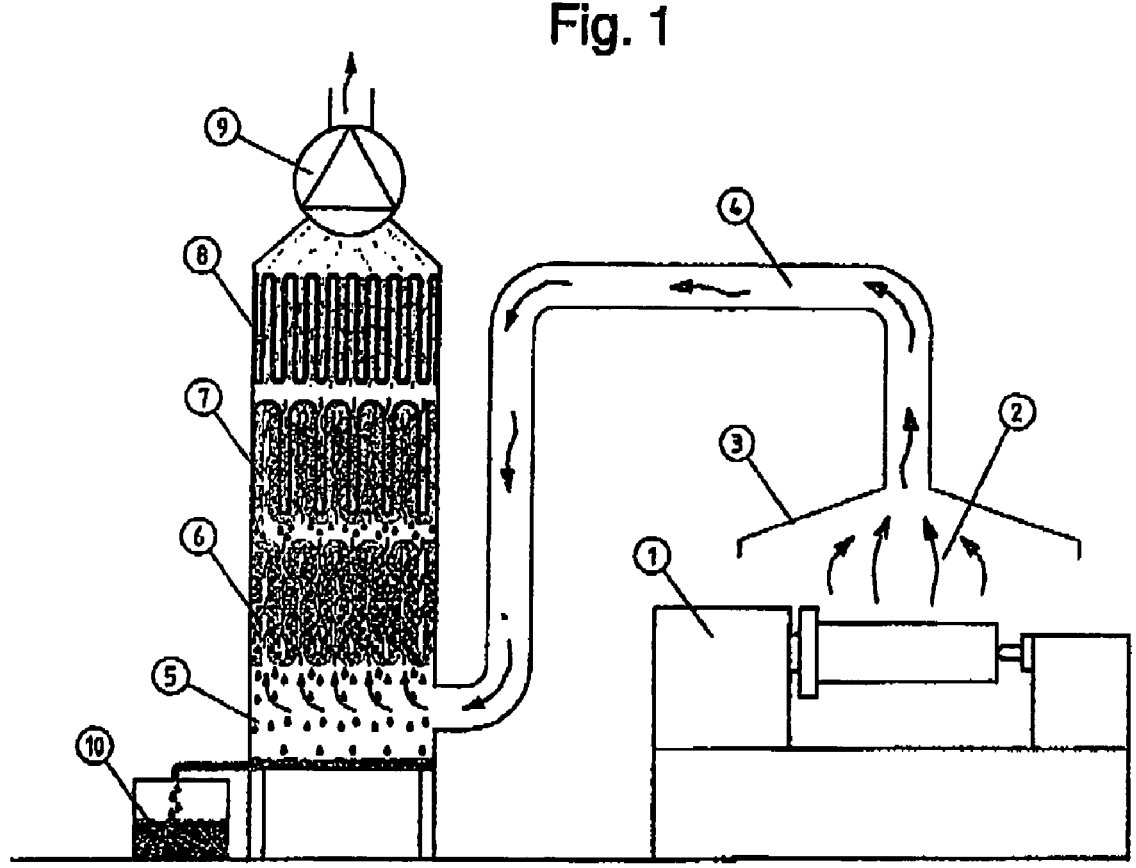
FIG. 1 shows a plant comprising a filter unit with connections to a converting machine.
Figure 2:
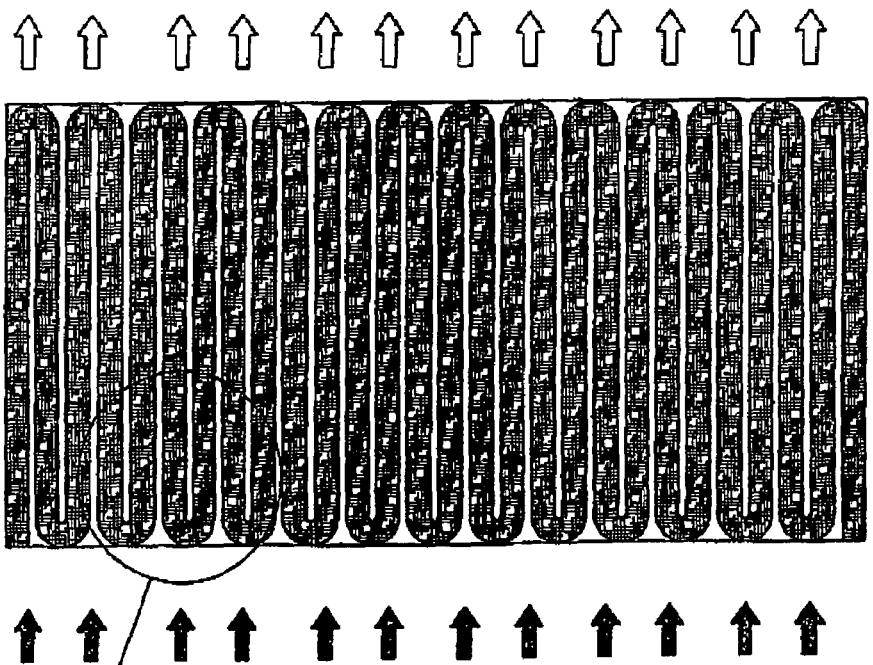
FIG. 2 shows a pleated filter mat intended for a magazine.
Figure 3:
FIG. 3 shows an enlarged view of part of the filter mat in FIG. 2.
Figure 3:
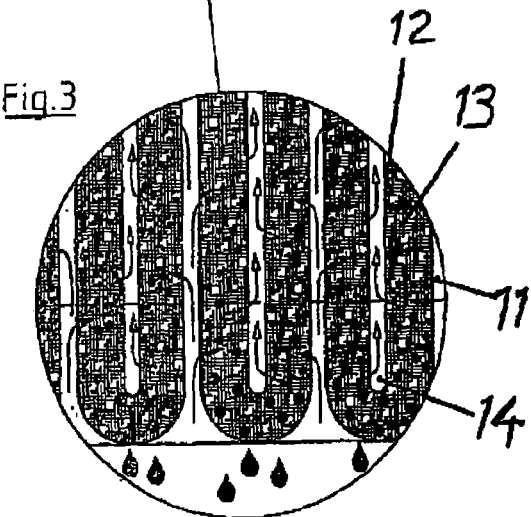
Figure 4:
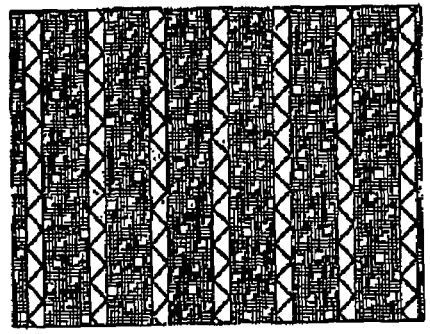
FIG. 4 shows a cross section through the partial view shown in FIG. 3.

FIG. 1 illustrates a complete air-purifying plant for a converting machine where 1 designates a converting machine producing impurities that may consist of particles in the air. The impurities produced are designated 2 and they are drawn up through a cowl 3 which may be of any design whatsoever depending on the source of pollution 1. The impurities are drawn up through a pipe 4 and supplied to a chamber 5 where the air containing impurities may shed heavier particles and liquid. The air then passes through the part-filter units 6-8 and is supplied to a fan 9 with an outlet through which the air is released to the surroundings. The fan is of medium-pressure radial type with blades bent backwards, and is suitably located in a sound-dampening chamber. Particles falling from the outer mats above are collected in the space 5. Liquid and particles collected in the space 5 are then carried to a container 10. The ventilation plant is so designed that the air passing through the pipe 4 has a velocity of about 20 m/s. When the air enters the space 5 at this speed it acquires a velocity of about 2 m/s thanks to the circumference of the chamber. The air then passes into the part-filter unit 6 with a velocity of between 4 and 6 m/s. When the air leaves the part-filter unit 6 it is supplied to the part-filter unit 7. Air transported further has a velocity of between 4 and 6 m/s. When the air is supplied to the filter part 8 it also has a velocity of between 4 and 6 m/s. The suction at the upper end of the filter unit can be achieved by any type of suction means placed arbitrarily. The cowl 3, pipe 4 and filter unit with the three part-filter units are so arranged that maximum suction effect is obtained from the fan 9. In FIGS. 2, 3 and 4 the filter mat is illustrated in the part-filter unit 6 as being placed in a magazine. The filter mat has two surface layers 11 and 12 which consist of a thin layer of fibres having a diameter of between 20 and 40 µm. The thickness of the layer is between 0.2 and 04. mm. The fibres of the layer are joined together by a thermal process and the layer allows through particles of up to a predetermined size. A layer 13 is arranged between the two surface layers and consists of several layers of fibres having diameters between 5 and 15 µm. The thickness of the layer may vary depending on the size of the particles in the polluted air and on how many particles the air contains in mg/m$^3$. The thickness selected may be a compromise between how large a part of the particles are filtered away and how long the service life of the filter is. The thickness of a layer may be between 10 and 20 mm and the layer may have a density of 100 to 200 kg/m$^3$. To enable good filtering the air is permitted to pass with a velocity of less than 0.1 m/s. The particles clump together and form drops and, thanks to the structure of the layer, its density and the low speed, they can pass downwards and leave the filter. The filter thus has a self-cleaning function.

The part-filter unit 7 has the same surface layers as in the part-filter unit 6, and also contains the intermediate layer present in the filter mat in the part-filter unit 6. The filter mat in the part-filter unit 7 also has an additional layer consisting of fibres having a diameter of between 0.5 and 3.5 µm. The fibres in the second intermediate layer are randomly oriented and the layer is suitably 6 mm thick and has a density of between 5-10 kg/m$^3$. After the part-filter unit 7 follows the part-filter unit 8 where the filter mat consist of a HEPA filter, the most important function of which is to enable a guaranteed degree of filtration since it is classified. The HEPA filter has a filtration capacity of 99.97% for particles of 3 µm. The space between two filter mats in the first filter mat is designated 14. As regards the filter mat in the part-filter unit 7 with two intermediate layers, these are designated 16 and 17, the surface layers are designated 15 and 18, and the space between two filter mats is designated 19.

Since the filter mats of each part-filter unit are arranged in a magazine it is extremely easy to replace a magazine.

A control system with sensors arranged in various parts of the plant is provided to control the velocities of the ventilation plant. The system controls the movable parts that can influence the air flow.

With the aid of the plant containing the filter unit and thanks to the structure of the filter mats and the velocity of the air through the filter mats, a filter unit can be provided that achieves total cleansing of the air flowing through it in such a way that self-cleaning occurs, thereby enabling considerable time saving between each service. Naturally a larger number of part-filter units can be arranged over and above said air cleaning if necessary.

The invention claimed is:

1. A filter unit for filtering polluted air, said filter unit comprising
   a housing having an upper end and a lower end;
   said housing having an inlet located at said lower end and an outlet located at said upper end;
   a plurality of part-filter units located in said housing, wherein said part-filter units are arranged one above the other;
   wherein each of said part-filter units comprises a plurality of filter mats located parallel with each other and with the direction of flow of the polluted air;
   wherein the direction of flow of a volume of air in the housing is from said lower end to said upper end of said housing;
   wherein all of the volume of air entering the inlet is filtered by a first part-filter unit located at the lowermost part of the housing, and then successively by part-filter units located above the first part-filter unit;
   and wherein matter trapped by said part-filter units drops by gravitational force to said lower end of said housing.

2. A filter unit as claimed in claim 1, wherein the filter mats in a unit are spaced from each other.

3. A filter unit as claimed in claim 1, wherein the filter mats are formed from a single fibre mat that is pleated.

4. A filter unit as claimed in claim 1, wherein each filter mat has outer layers with a thickness of from 0.2-0.4 mm consisting of fibres with a diameter of from 20-40 µm, which fibres are thermally united; and wherein an intermediate layer is disposed between said outer layers.

5. A filter unit as claimed in claim 4, wherein the intermediate layer comprises one or more layers of fibres with a diameter of between 5 and 15 µm, the layers having a thickness varying between 10 and 20 mm and also a density of between 100-200 kg/m$^3$.

6. A filter unit as claimed in claim 4, wherein a second intermediate layer is disposed between said outer layers, and said second intermediate layer is arranged with randomly oriented fibres that having a diameter of 0.5-3.5 µm, a thickness of from 5-10 mm and a density of between 20 and 30 kg/m$^3$.

7. A filter unit as claimed in claim 6, wherein one or both of the intermediate layers are pinned.

8. A filter unit as claimed in claim 1, wherein one of the part-filter units has a fibre mat that fulfils the requirements of a HEPA classification.

9. A filter unit as claimed in claim 8, wherein said part-filter unit is the unit in the stack of part-filters that constitutes the outlet.

10. A filter unit as claimed in claim 9, wherein the outlet is connected to an extractor such as a fan built into the unit or arranged separately.

11. A filter unit as claimed in claim 10, wherein at the inlet to the unit is a space for collecting liquid and impurities.

12. A filter unit as claimed in claim 1, wherein the inlet of the unit is connected by a transfer means to an intercepting arrangement at the point where polluted air is produced.

13. A filter unit as claimed in claim 12, wherein the flow rate in the transfer means shall be so chosen that impurities do not become lodged on the walls of the transfer means, a suitable velocity thus being in excess of 20 meters per second.

14. A filter unit as claimed in claim 1, wherein the filter unit and its connected components are provided with probes connected to a control member that sets settable members so that the desired flow rates are obtained.

15. A filter unit as claimed in claim 11, wherein the air velocity through the extractor is set at 2 m/s, so that any liquid and particles are collected in the space.

16. A filter unit as claimed in claim 11, wherein the air velocity through a filter mat through the extractor suitably reaches a value of less than 0.1 m/s.

17. A filter unit as claimed in claim 1, wherein the filtering capacity of a filter mat is controlled by the diameters, orientation and density of the fibres.

18. A filter unit as claimed in claim 16, wherein each part-filter unit is self-cleaning depending on the velocity of the air through a filter mat.

* * * * *